Aug. 25, 1925.

J. G. SNYDER 1,550,925

TIE AND RAIL FASTENER

Filed April 14, 1921    3 Sheets—Sheet 1

WITNESSES
G. W. Taylor
A. L. Kitchin

INVENTOR
JOHN G. SNYDER
BY Munn
ATTORNEYS

Aug. 25, 1925.
J. G. SNYDER
1,550,925
TIE AND RAIL FASTENER
Filed April 14, 1921      3 Sheets-Sheet 2
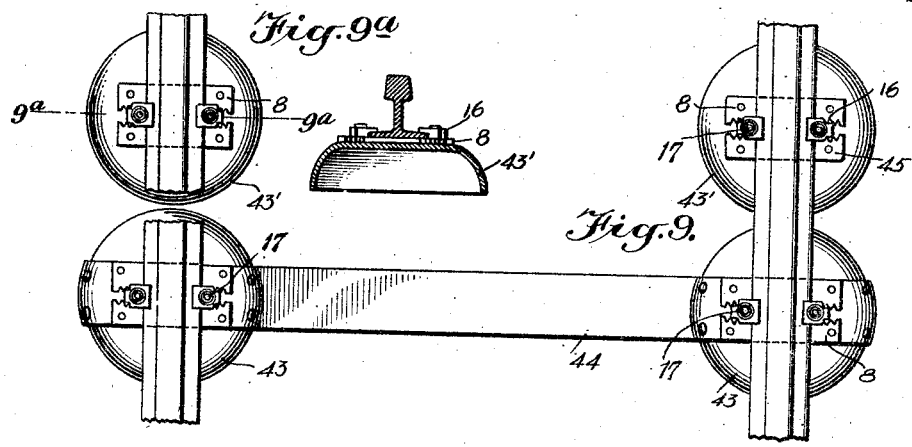
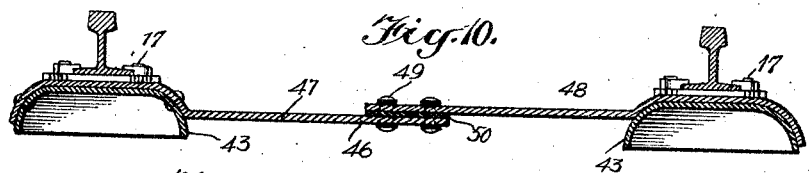
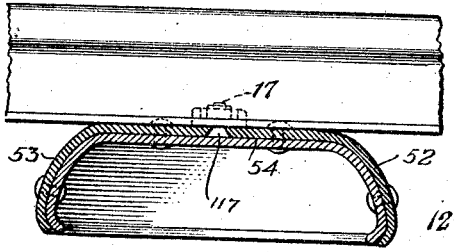
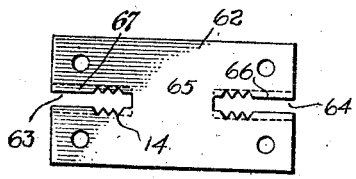
INVENTOR
JOHN G. SNYDER
BY
ATTORNEYS Aug. 25, 1925.
J. G. SNYDER
TIE AND RAIL FASTENER
Filed April 14, 1921     3 Sheets-Sheet 3
1,550,925
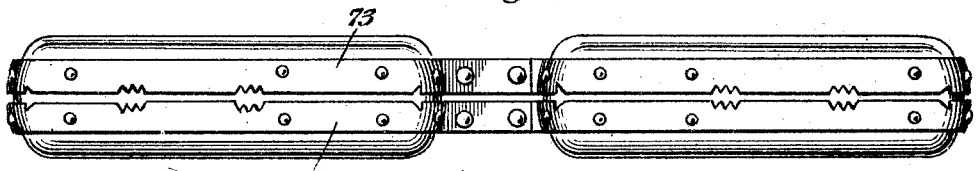
Fig. 14.
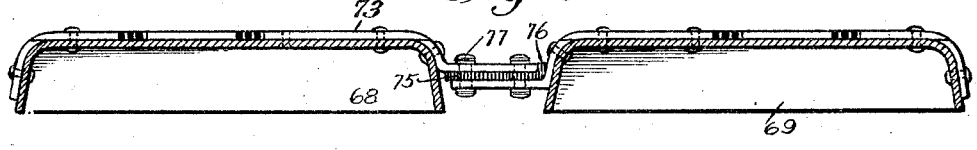
Fig. 15.
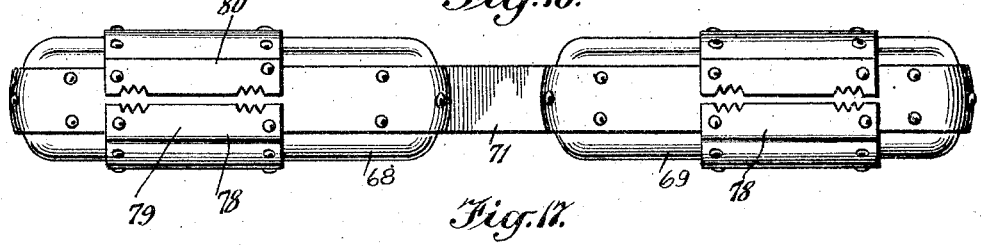
Fig. 16.
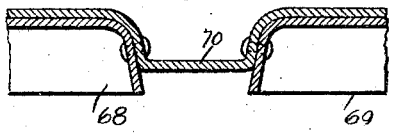
Fig. 17.
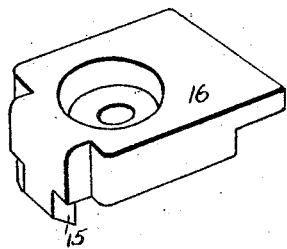
Fig. 18.
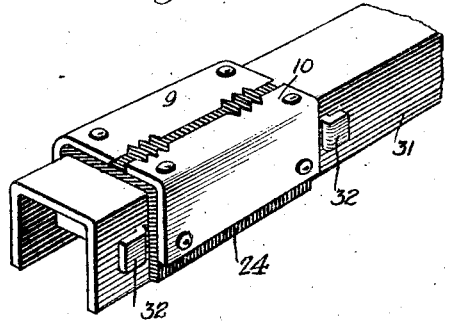
Fig. 5.ᵃ
WITNESSES
INVENTOR
JOHN G. SNYDER
BY
ATTORNEYS Patented Aug. 25, 1925.

1,550,925

UNITED STATES PATENT OFFICE.

JOHN G. SNYDER, OF NEW YORK, N. Y.

TIE AND RAIL FASTENER.

Application filed April 14, 1921. Serial No. 461,208.

*To all whom it may concern:*

Be it known that I, JOHN G. SNYDER, a citizen of the United States, and a resident of the city of New York, borough of Manhattan, in the county and State of New York, have invented a new and Improved Tie and Rail Fastener, of which the following is a full, clear, and exact description.

This invention relates to railway ties and to fastening means co-acting therewith for securing rails to the ties and has for an object to provide an improved construction which is constructed of metal and which presents an ample surface to the roadbed whereby a proper support is provided for the rails at all times.

Another object of the invention is to provide a tie with a suitable fastener wherein the tie presents a suction cup device arranged to thereby adhere more firmly to the roadbed.

A further object of the invention is to provide a tie which utilizes an inverted cup-shaped body structure either in a single or in a plurality of parts.

An additional object is to provide a fastener for metal ties which will act in the double capacity of a fastener and re-inforcing and supporting device.

Another object of the invention is to provide a metallic tie and fastener constructed so that the same may be used either with or without insulating members and also formed so that the insulating members may be arranged at different points while securing substantially the same results.

In the accompanying drawings—

Figures 5, 6, 7, 8:
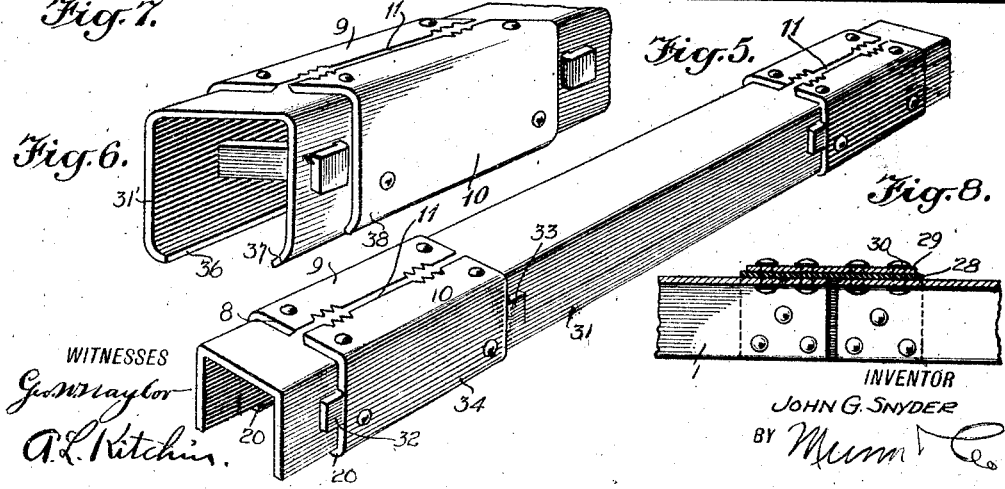
Figure 5 is a perspective view of a modified form of tie to that shown in Figure 1.

Figure 5ª is a perspective view similar to one end of Figure 5 but showing how insulation may be provided between the fastener bar and the tie body.

Figure 6 is a fragmentary perspective view of one end of a tie similar to Figure 5 but showing a modified arrangement of lower edge.

Figure 7 is a longitudinal vertical section through a tie similar to that shown in Figure 5 but showing the same divided approximately at the center and supplied with an insulating plate.

Figure 8 is another modified arrangement of connecting and dividing a tie together with an insulating plate.

Figure 9 is a top plan view of a modified form of tie and inverted supporting pan, the same being shown in connection with rails.

Figure 9ª is a longitudinal vertical sectional view through Figure 9 approximately on line 9ª—9ª.

Figure 10 is a sectional view through a modified form of tie to that shown in Figure 9, said modification consisting in the arrangement of insulation at the center.

Figure 11 is a top plan view of an inverted tie pan disclosing a modified form of the invention to that shown in Figure 9.

Figure 12 is a sectional view through Figure 11 on line 12—12, the same being shown in connection wtih a rail and fastener.

Figure 13 is a top plan view of a slightly modified form of fastener to that illustrated in Figures 1 to 4 inclusive.

Figure 14 is a plan view of another modified form of invention illustrating elongated tie pans instead of round.

Figure 15 is a longitudinal vertical section of the tie illustrated in Figure 14.

Figure 16 is a view similar to Figure 14 but showing a single tie bar.

Figure 17 is a fragmentary sectional view showing a structure similar to that illustrated in Figure 15 but arranged without the connecting insulating plate.

Figure 18 is an enlarged perspective view of a clip disclosing certain features of the invention.

Referring to the accompanying drawings by numerals, 1 indicates a tie body which is an inverted pan or cup-shaped member arranged so that the edges will face downwardly whereby it may properly engage the roadbed and the roadbed may be properly tamped into the hollow space beneath the same. Preferably, the body 1 is comparatively flat at the top section 2 and curving at the edges 3 and 4 for forming downwardly extending sections or sides 5 and 6 which sections or sides may be vertical or slightly flared. These sides or sections extend around for forming integral end sections 7 so that a complete inverted closure is presented extending a suitable distance from each side of the rails when properly positioned thereon. This tie may be made of the same length as the ordinary wood ties now in common use or of some other length as preferred. In using the ordinary wood tie now commonly utilized by the railroads, the wood transmits to the rails the cushion or resiliency of the roadbed so that as the train moves thereover there is a slight yielding action instead of a rigid resistance.

In the construction of certain metal ties, heretofore wood blocks have been used in the attempt to secure a resilient action in the belief that the resilient action was entirely in the wood. It has been ascertained, however, that most of the yielding or cushion effect is produced by the roadbed itself and by providing an inverted suction cup-shaped member as shown in Figures 1 to 4 inclusive, the rails are supported practically on the roadbed itself by reason of the fact that this tie encloses and is supported by a certain section of the roadbed, which section communicates the strain laterally as said strain penetrates the roadbed. In this way, the tie permits the shock and strain on the rails to be communicated to a strip of roadbed extending transversely and communicates the strain in such a manner that said strain will penetrate substantially the entire roadbed and thereby the entire cushion effect of the roadbed will be utilized to secure the desired easy riding action on the rails.

Figures 3, 4:
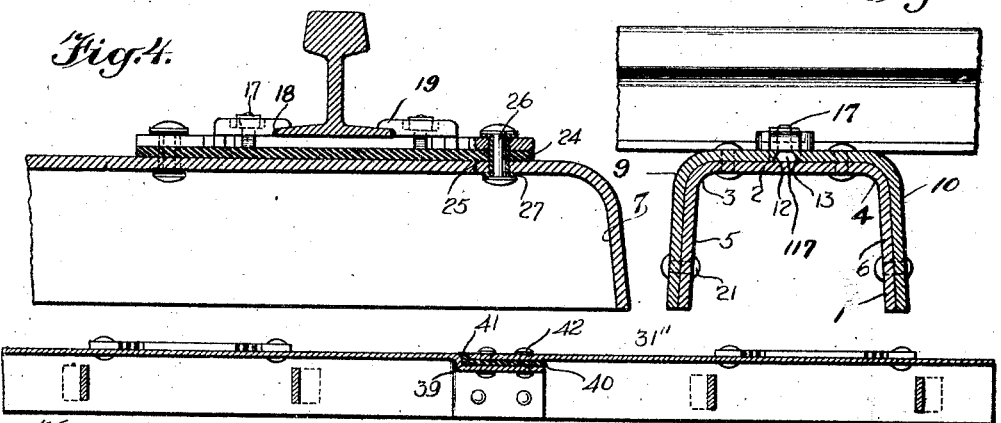
Figure 3 is a sectional view on an enlarged scale through Figure 2 on line 3—3.
Figure 4 is a longitudinal vertical sectional view through the tie and fastener disclosing an embodiment of the invention, said sectional view being taken approximately on line 4—4 of Figure 1.

In order to properly secure the rails to the tie 1, an improved form of fastener is utilized which is an improvement over the construction shown in my co-pending application on "Rail tie and fasteners" Serial Number 430,343. As illustrated particularly in Figures 1 and 3 the fastener plate 8 consists of sections 9 and 10 with a slot or opening 11 arranged therebetween provided with overhanging shoulders 12 and 13 similar to the construction shown in the above mentioned co-pending application. A number of oppositely facing notches 14 are also provided in the respective sections 9 and 10 for receiving the laterally projecting fastening members 15 of the clips 16. Each of these clips is provided with an aperture for receiving clamping bolts 17 provided with heads 117 interlocking with the shoulders 12 and 13 (Figure 3). A shoulder or stop 18 is arranged on each clip together with an overhanging portion 19 adapted to overhang the base of the rail being secured in place. In the drawing, two clips have been shown for holding the rail in place together with a number of notches 14 whereby the rail may be adjusted laterally in either direction. However, if desired a stop or hook shaped member could be formed integral with the fastener plate 8 at one end so that one edge of the base of the rail may be forced thereunder and then only a single clip 16 used, though ordinarily it is preferable to use two clips. As illustrated in Figure 3, the sections 9 and 10 extend around and over the tie 1 so that their lower edges are substantially parallel with the lower edges of the tie body 1. If desired, the lower edges of these sections could be turned over so as to form a hook or stop 20 as illustrated in Figure 5. Any desired number of rivets 21 or other securing means are used for firmly securing the fastener plate 8 on the tie body 1 whereby it will act in the double capacity of a fastener plate and a re-inforcement for the tie body so that an additional thickness of metal will be under the rail.

In Figure 3 the tie body 1 has been shown as curved at 3 but this can be a sharp bend as illustrated in Figure 5 without departing from the spirit of the invention.

Figure 1:
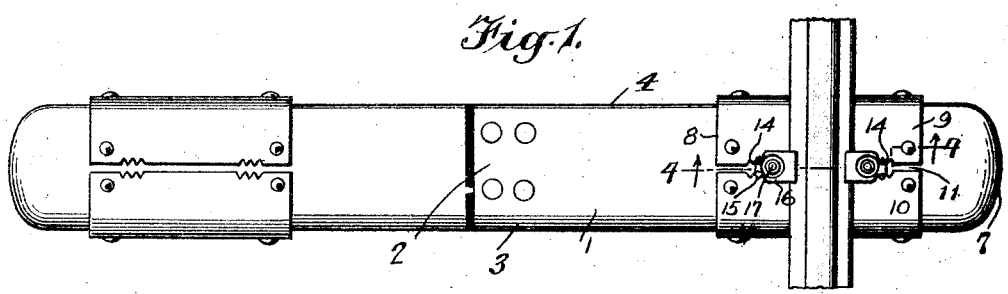
Figure 1 is a top plan view of a tie and a fastener, the same disclosing an embodiment of the invention.
Figure 2:
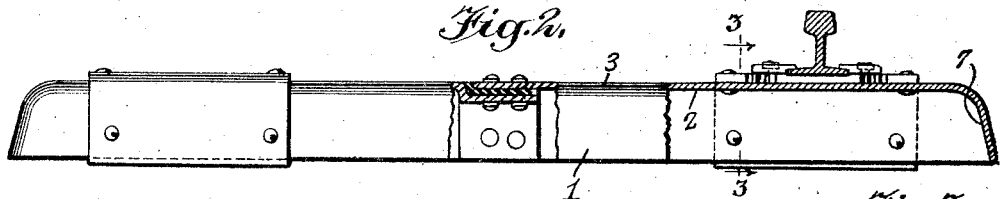
Figure 2 is a side view with certain parts broken away of the structure shown in Figure 1.

As shown in Figures 1, 2 and 3 the fastener plate has been secured directly to the tie without the use of any insulating members but it will be understood that the construction can be used either with or without insulation. In order to bring out more clearly how the construction may be used with insulation, Figure 4 has been provided which is similar to the construction shown at the right in Figure 2 but showing an insulating plate 24 arranged in position. This plate extends preferably from one lower edge to the tie body 1 upwardly, across the top and then downwardly to the other lower edge so that the sections 9 and 10 rest directly on this plate and do not come in contact with the tie body 1. The plate 24 is provided with either integral or separately constructed tubular members 25 so that the rivet or other securing means 26 will not come in electric contact with the tie body 1. In addition, an insulating washer 27 is arranged preferably at the bottom of the rivet 26 to complete the insulation. It is to be understood that any desired number of rivets 26 may be provided and properly instruction and arrangement the rails are insulated from each other without presenting any insulating material beneath the rail.

In Figure 11 will be seen a modified form of fastener member or plate 51 which is divided into sections 52 and 53, said sections fitting against the inverted cup-shaped member 54 and covering the same except for the slot 55. The sections 52 and 53 are provided with facing notches 56 and with overhanging shoulders 57 and 58, which shoulders extend preferably in a straight line from point 59 to point 60. When inserting the clamping bolt 17, the head 117 is inserted at either point 59 or 60 (Figure 12) and slid along beneath the shoulders to the desired point, after which, the fastener clip 16 is placed thereon and clamped down by a suitable nut. The lower edge of the inverted cup-shaped member 54 and the sections 52 and 53 may be straight as shown in Figure 10 or may be curved inwardly as shown in Figure 12. When the construction is formed as shown in Figure 11, the same may be used as an independent tie member or support in a similar manner to the way the structure shown in Figure 9ª or, if desired, a tie member 61 may be used and riveted in place to the sections 52 and 53.

In Figure 13, a modified form of tie plate is shown in which the plate 62 is provided with notches or slots 63 and 64 extending from the ends of the plate inwardly but leaving a central solid section 65 on which the rail is adapted to rest. This plate is provided with notches 14 as shown in the form illustrated in Figure 1 so as to readily receive the clips 16. Overhanging shoulders 66 and 67 are provided at each end of this plate for receiving the bolt 17 which is used for clamping the clip 16 in position.

In Figures 14 and 15 will be seen a further modified form of the invention in which the inverted cup-shaped members 68 and 69 are elongated transversely of the roadbed and are approximately half as long as the tie body shown in Figure 1. These inverted cup-shaped members may be connected together by a single insulated bar or tie member 70 as shown in Figures 16 and 17, or by a pair of insulated bars 73 and 74, as shown in Figures 14 and 15. The fastener plate shown in Figure 1 or in Figure 9ª is not necessary as the ends of the bars or tie members 73 and 74 are made into fastener plates with overhanging shoulders and notches for receiving the bolt and clip in a similar manner to the way the bolt and clip are received in Figure 1. However, in order that the inverted cup-shaped member 68 may be insulated from member 69, the respective bars or tie members 73 and 74 are overlapped as shown in Figure 15 and an insulating plate 75 arranged therebetween which plate is preferably provided with an upstanding flange 76. Rivets 77 extend through the overlapping ends of the bars 73 and 74 and insulating plate 75, said rivets being provided with suitable insulating means, as for instance, that described in Figure 4. Where a single tie bar 71 is used as shown in Figure 16, fastening plates 78 must be used, said fastening means being similar to those used in Figure 1 except that they are bent at 79 and 80 so as to conform to the bar 71 which they overlap.

When using the tie shown in Figures 5 and 6, the tie member if desired may be filled with any suitable filling, as for instance, a mixture of tar and an aggregate though usually the roadbed tamped therein will answer most requirements. This construction may be made of the usual length for an ordinary road construction or may be made extra long to take care of switches and special track conditions. This same fact is also true in respect to the construction shown in Figure 1. Preferably, the tie body 1, however, is not made longer than a double length provided the same is made of one integral piece. In case a construction similar to that shown in Figure 1 but very much longer is desired, sections could be overlapped and riveted or otherwise rigidly secured together for making a complete inverted cup-shaped tie as long as required. Preferably, the insulating means in a longer tie of this kind would be arranged beneath the fastener plates, though if desired each section could be insulated from each other as shown in Figures 7 or 8.

What I claim is:—

1. In a tie and rail fastener, a tie body and a fastener structure therefor comprising a pair of plate sections secured to the top of said tie body, said sections being spaced apart so as to present a slot therebetween extending longitudinally of the tie body on substantially a central line, each of said sections being formed to present an overhanging shoulder and a notch, a clip formed with means for holding a rail on said sections, and means extending into said notch and a bolt extending through said clip positioned with its head interlocking with said shoulders, said bolt acting to hold said clip in operative position.

2. A tie comprising a tie body, a fastener plate arranged adjacent each end thereof divided into two sections and bent to snugly fit the top of the tie body and the sides thereof, said sections having facing shoulders, means for rigidly securing said sections to said tie body, a clip for each of said fastener plates for clamping a rail thereto and a bolt for each of the clips for clamping the clips in position, said bolt being positioned so that the head will interlock with said shoulders.

sulated as just described or this insulation may be slightly varied if the structure still maintains a proper insulation and a proper clamping or securing action for rigidly holding the sections 9 and 10 in place.

If desired, instead of providing insulation as shown in Figure 4, the tie body 1 could be cut in two at some point between the ends and connected together as shown in Figure 8 with the ends spaced a short distance apart and with a sheet of insulation 28 arranged on the upper surface together with a metal plate 29 conforming to the transverse section of the body 1. A suitable number of rivets 30 are also provided, said rivets being insulated similar to rivets 26. In Figure 8 the insulation 28 and associated parts are arranged exteriorly of the tie body 1 but if desired, these could be arranged interiorly without departing from the spirit of the invention.

In Figure 5 will be seen a modified form of the invention to that shown in Figure 1 wherein the tie body 31 is U-shape in cross section with the ends open and with combined tie re-inforcing members 32 and 33 arranged adjacent each end, said members being spaced any desirable distance on each side of a line directly below where the rail is placed on the tie so as to form a sort of box for retaining the tie from shifting beneath the rails. This construction also permits the roadbed to be tamped tightly in place and thereby provide the support desired. In this form of the invention the sections 9 and 10 of the fastener plate or member 8 extend downwardly over the side of the tie body 31 similar to the way they are positioned on the tie body 1 but are preferably provided with turned in end or hook sections 20 which by reason of being turned over present a more or less rounded edge 34 on each side, said rounded edge permitting an easy tamping of the roadbed at this point.

Figure 5ᵃ is identical with Figure 5 except that an insulating block 24 has been arranged between the tie body 31 and the fastening plate or member 9. In Figure 6 the same construction is presented as shown in Figure 5 except the tie body 31' is provided with rounded lower edges 36 and 37 and the sections 9 and 10 are also provided with rounded edges 38. If desired, an insulating plate 24 can be arranged on this form of tie in a similar manner to the way it is arranged in Figure 5ᵃ.

In Figure 7 will be seen a longitudinal vertical section through a modified form of the structure shown in Figure 5. In this form of the invention the tie body 31″ is divided at a point between the ends with one portion offset at 39 so as to receive the insulating plate or member 40 which is preferably provided with a turned up edge 41. One part of the tie body, therefore, overlaps the insulating plate 40 while the other underlaps the same and the two sections of the tie body are secured together by rivets 42 in the same manner as the parts are secured together by rivets 26. If desired, an insulating sleeve could be provided for each of the sections of the body and an insulating washer on each end though the simple arrangement shown in Figure 7 would be the ordinary construction. The section shown in Figure 7 is a section of a tie similar to the structure shown in Figure 5 except for the central insulation but it will be evident that the tie body 1 shown in Figure 1 could be divided and overlapped in the same manner so that the two ends would be insulated from each other. In case this was done, it would merely be another way of accomplishing what is accomplished by the structure shown in Figure 8.

In Figures 9 and 9ᵃ a modified construction is shown in which an inverted shaped member 43 is connected with the tie body 44 in a similar manner to my co-pending application heretofore referred to. The inverted cup-shaped member 43', however, is provided with a tie plate 45 similar to the tie plate shown in Figure 1 except it is not provided with the downwardly extending sides, said tie plate being riveted or otherwise rigidly secured to the cup-shaped member 43″ so that the fastening clips 16 may be properly act to connect the inverted cup-shaped member to the rail. In this showing the insulation between the inverted cup-shaped member and the fastener plates 45 is omitted because there is no connection between opposite members 43'. However, if desired, the insulating plate can be provided. In providing ties or tie members for railways, one complete tie as shown in Figure 9 may be used for every three or four tie members 43'. The tie members or inverted cup-shaped members 43' give the support and properly connect the rail with the roadbed while the tie body 44 at intervals will act as means for tying the rails against lateral movement. Where the rolling stock is comparatively light, the complete tie provided with a tie body 44 may be used at great intervals, as for instance, one at a distance of the length of each rail.

Figure 10 is a longitudinal vertical section through a complete tie which is a modification of the structure shown in Figure 9, said modification consisting in dividing the tie body 46 into sections 47 and 48 and overlapping these sections so that the rivets 49 may be used for connecting the sections together and clamp in place an insulating plate 50. Preferably, the rivets 49 are insulated as illustrated and described in respect to Figure 4. By providing this con- 3. A tie comprising a tie body, a fastener plate arranged adjacent each end of said tie body and formed in sections, each section fitting flatwise against part of the top of the tie body and the remaining part fitting flatwise against the sides of the tie body, each pair of sections having facing shoulders, a clip for each fastener plate for clamping a rail to the respective fastener plates and a bolt for each fastener plate arranged with its head interlocking with the shoulders of said sections, said bolts acting to clamp the clips in position.

4. A tie comprising a tie body, a fastener plate arranged adjacent each end of said body, each of said fastener plates being formed in two sections, said fastener plates hugging the top and sides of the body adjacent the ends thereof, rivets for securing the fastener plates in position, each of said fastener plates having an opening therein provided with overhanging shoulders and a notch, a clip formed with a section for clamping a rail and a holding member extending into said notch and a bolt having its head interlocked with said overhanging shoulders co-acting with said clip for clamping the clip in position.

5. A clip for tie fasteners comprising a body having a shoulder at one end, a bent down section at the opposite end merging into laterally extending holding members, said body having an aperture therethrough and a countersunk portion surrounding said aperture whereby the clamping bolt may be maintained within the clip.

6. A tie comprising a tie body, a fastener plate for said tie body formed in two sections, each section having a portion fitting against the top of the tie body and a portion bent to fit against the side of the tie body, each of said sections having an overhanging shoulder and a notch, said notches and said shoulders facing, rivets extending through said sections, said plate and said tie body, a clip forming means for engaging the rail and means extending into said notches and a bolt for clamping said clip in position, said bolt being positioned so that its head will interlock with said overhanging shoulders.

7. A tie comprising a metallic body divided into two sections at a point between the ends, said sections overlapping at the point of division, one of said sections being reduced in size at one end and projecting into the other section, an insulating plate arranged between the overlapping portions of said sections, fastening means for securing said sections together, means for insulating said fastening means and rail securing means arranged on each end of said tie.

8. In a tie of the character described, a body, a tie plate arranged adjacent each end, each of said tie plates being provided with portions fitting the sides of the body and bent edges projecting beneath the edges of the body, said tie plates being also formed with means for receiving rail fastening members and means for rigidly securing said tie plates to said body.

9. In a tie of the character described, a body, a tie plate arranged adjacent each end of the body divided into two sections, each section of each tie plate fitting flatwise against the top of said body, a portion extending along the sides of said body and a turned in hook portion fitting under the lower edge of said body, each of said sections also being formed with an overhanging shoulder and a notch for receiving a rail fastener clip.

10. In a device of the character described an inverted trough-shaped member having a closed top, said top being flat, a tie plate secured to said top, said tie plate being formed with facing overhanging shoulders adjacent each end and with a notch adjacent each end, a clip adapted to clamp a rail onto said plate, said clip being formed with means engaging said notches and a bolt for each clip having its head interlocking with said shoulders for clamping the respective clips in position.

11. In a tie of the character described a body substantially U-shaped in cross section, a fastener plate substantially U-shape in cross section fitting over said body and divided into two parts, each part having a shoulder and a clip receiving notch, and means for rigidly securing said fastener plate to said body.

12. In a device of the character described a fastener clip comprising a body provided with a shoulder, a turned down section merging into laterally projecting V-shaped holding members and an aperture provided with a comparatively large countersunk portion for receiving the head of a retaining bolt.

13. In a tie, a plate for the base of a rail, comprising a pair of substantially L-shaped sections arranged at each side of the tie and forming between the two a slot extending longitudinally of the tie, and means adjustable in said slot to clamp in place a rail on said plate.

14. In a tie and fastener, a plate for receiving the base of a rail, said plate being formed with a slot and a plurality of notches at the sides of the slot, said plate being also constructed to present overhanging shoulders, a clip for clamping a rail to said plate, and a bolt having its head slidingly mounted beneath said shoulders acting on said clip for clamping the same in position.

15. The combination with a tie, of a fastener plate therefor formed with a pair of spaced facing shoulders whereby a slot extending longitudinally of the tie will be presented, said shoulders being formed with notches opening into said slot, a clip having members extending into opposite notches for clamping a rail on the fastener plate, and a bolt with its head interlocking with said shoulders extending through said clip for clamping the clip in operative position.

16. In a tie, a fastener plate having opposing sections extending from near the center of the tie across the top and down over the sides riveted to the tie both at the upper face and the sides of the tie, and means coacting with said plate for clamping a rail to said plate.

JOHN G. SNYDER.